US012614084B2

(12) United States Patent
Tseng et al.

(10) Patent No.: US 12,614,084 B2
(45) Date of Patent: Apr. 28, 2026

(54) ATRIAL HIGH RATE EPISODE PREDICTION MODEL TRAINING METHOD AND APPARATUS

(71) Applicant: National Yang Ming Chiao Tung University, Hsinchu City (TW)

(72) Inventors: Shin-Mu Tseng, Hsinchu City (TW); Hsuan-Ming Tsao, Yilan County (TW); Sung-Hao Huang, Yilan County (TW); Gau-Jun Tang, Taipei City (TW)

(73) Assignee: National Yang Ming Chiao Tung University, Hsinchu City (TW)

( * ) Notice: Subject to any disclaimer, the term of this patent is extended or adjusted under 35 U.S.C. 154(b) by 570 days.

(21) Appl. No.: 18/205,942

(22) Filed: Jun. 5, 2023

(65) Prior Publication Data

US 2024/0242094 A1 Jul. 18, 2024

(30) Foreign Application Priority Data

Jan. 18, 2023 (TW) .................................. 112102439

(51) Int. Cl.
*G06N 5/022* (2023.01)
(52) U.S. Cl.
CPC .................................... *G06N 5/022* (2013.01)
(58) Field of Classification Search
CPC ............................................ G06N 5/022
USPC .......................................................... 706/12
See application file for complete search history.

(56) References Cited

U.S. PATENT DOCUMENTS

2020/0129130 A1* 4/2020 Korhonen .............. G16H 50/20

FOREIGN PATENT DOCUMENTS

| CN | 107405087 A | 11/2017 | |
| CN | 108186011 A | 6/2018 | |
| CN | 109171712 A * | 1/2019 | .............. A61B 5/318 |
| CN | 112365978 A | 2/2021 | |

OTHER PUBLICATIONS

Kuba, Transfer learning for ECG classification, 2021 (Year: 2021).*
Cosimo Ieracitano et al., "A novel multi-modal machine learning based approach for automatic classification of EEG recordings in dementia," Neural Networks, vol. 123, 2020, pp. 176-190 (file attached, ref.01).

* cited by examiner

*Primary Examiner* — Tarek Elchanti
(74) *Attorney, Agent, or Firm* — CKC & Partners Co., LLC

(57) ABSTRACT

A prediction model training method comprises following steps. A plurality of valid electrocardiograms is filtered from a plurality of electrocardiograms according to an elimination rule. A plurality of training features corresponding to the valid electrocardiograms is generated according to a training category set. A prediction model is trained according to the valid electrocardiograms, the training features, and a plurality of episode data corresponding to the valid electrocardiograms. The prediction model is configured to predict whether the atrial high rate episode state will last more than a time threshold according to an untested electrocardiogram in the atrial high rate episode state.

14 Claims, 3 Drawing Sheets

20 filtering a plurality of valid electrocardiograms from the electrocardiograms according to an elimination rule, wherein each of the electrocardiograms corresponds to an earliest electrocardiogram segment of each of a plurality of original electrocardiograms, and each of the original electrocardiograms belongs to the atrial high rate episode state — S22 generating a plurality of training features corresponding to the valid electrocardiograms according to a training category set — S24 training a prediction model according to the valid electrocardiograms, the training features, and the episode data corresponding to the valid electrocardiograms — S26

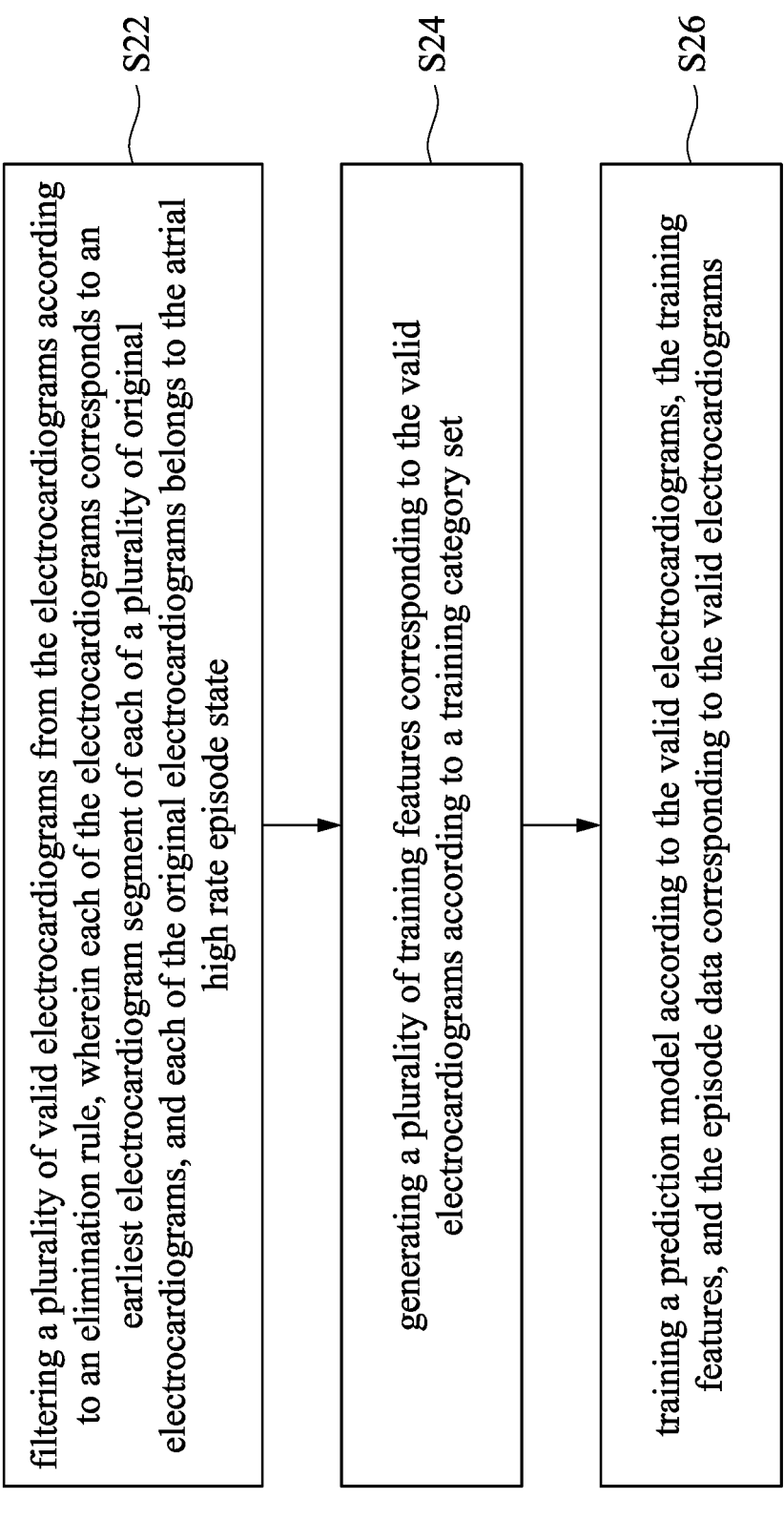

20

S22 filtering a plurality of valid electrocardiograms from the electrocardiograms according to an elimination rule, wherein each of the electrocardiograms corresponds to an earliest electrocardiogram segment of each of a plurality of original electrocardiograms, and each of the original electrocardiograms belongs to the atrial high rate episode state

S24 generating a plurality of training features corresponding to the valid electrocardiograms according to a training category set

S26 training a prediction model according to the valid electrocardiograms, the training features, and the episode data corresponding to the valid electrocardiograms

Fig. 2

ATRIAL HIGH RATE EPISODE PREDICTION MODEL TRAINING METHOD AND APPARATUS

CROSS-REFERENCE TO RELATED APPLICATION

This application claims priority to Taiwan Application Serial Number 112102439, filed Jan. 18, 2023, which is herein incorporated by reference in its entirety.

BACKGROUND

Field of Invention

The present disclosure relates to a prediction model training method. More particularly, the present disclosure relates to an atrial high rate episode prediction model training method.

Description of Related Art

According to clinical researches, if an atrial high rate episode (AHRE) lasts more than a specific time period, the possibility of atrial fibrillation will be greatly increased, and there is a further risk of stroke.

In view of this, how to predict whether an atrial high rate episode will last more than the specific time period is the goal that the industry strives to work on.

SUMMARY

The disclosure provides a prediction model training method. The prediction model training method is adapted for use in an electronic apparatus, wherein the prediction model training method comprises the following steps: filtering a plurality of valid electrocardiograms from a plurality of electrocardiograms according to an elimination rule, wherein each of the electrocardiograms corresponds to an earliest electrocardiogram segment of each of a plurality of original electrocardiograms, and each of the original electrocardiograms belongs to an atrial high rate episode state; generating a plurality of training features corresponding to the valid electrocardiograms according to a training category set; and training a prediction model according to the valid electrocardiograms, the training features, and a plurality of episode data corresponding to the valid electrocardiograms; wherein each of the episode data comprises an episode duration, the episode duration is configured to indicate a time period of the atrial high rate episode state; and the prediction model is configured to predict whether the atrial high rate episode state will last more than a time threshold according to an untested electrocardiogram in the atrial high rate episode state.

The disclosure also provides a prediction model training apparatus comprises a storage and a processor. The storage is configured to store a plurality of electrocardiograms and a plurality of episode data corresponding to the electrocardiograms, wherein each of the electrocardiograms belongs to an atrial high rate episode state, each of the episode data comprises an episode duration, and the episode duration is configured to indicate a time period of the atrial high rate episode state. The processor is electrically connected to the storage. The processor is configured to filter a plurality of valid electrocardiograms from the electrocardiograms according to an elimination rule, wherein each of the electrocardiograms corresponds to an earliest electrocardiogram segment of each of a plurality of original electrocardiograms, and each of the original electrocardiograms belongs to the atrial high rate episode state. The processor is further configured to generate a plurality of training features corresponding to the valid electrocardiograms according to a training category set. The processor is further configured to train a prediction model according to the valid electrocardiograms, the training features, and the episode data corresponding to the valid electrocardiograms, wherein the prediction model is configured to predict whether the atrial high rate episode state will last more than a time threshold according to an untested electrocardiogram in the atrial high rate episode state.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2 is a flow diagram illustrating a prediction model training method according to some embodiments of the present disclosure.

DETAILED DESCRIPTION

Figure 1:
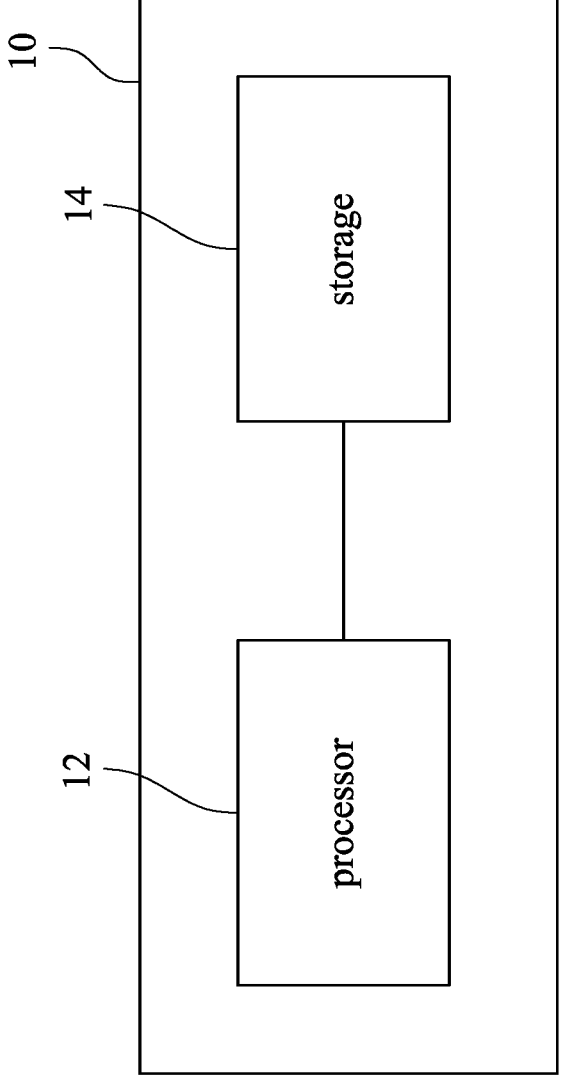
FIG. 1 is a schematic diagram illustrating a prediction model training apparatus according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a prediction model training apparatus 10 according to some embodiments of the present disclosure. The prediction model training apparatus 10 is configured to train a prediction model, and the prediction model is configured to predict whether an atrial high rate episode will last more than a specific time period (e.g., 6 minutes) according to an electrocardiogram. In some embodiments, the prediction model training apparatus 10 can comprise a general purpose computer, a server, and/or other computing device. The prediction model training apparatus 10 comprises a processor 12 and a storage 14.

The storage 14 is configured to store a plurality of electrocardiograms and a plurality of episode data corresponding to the electrocardiograms, wherein each of the electrocardiograms belongs to the atrial high rate episode state, each of the episode data comprises an episode duration, and the episode duration is configured to indicate a time period of the atrial high rate episode state. It is noted that, in some embodiments, the episode data can also comprise other related data configured to assist in determination of the atrial high rate episode state corresponding to the electrocardiograms.

In some embodiments, the electrocardiograms and the episode data can also be trained and calculated after obtained from an external apparatus (e.g., a cloud database) by the prediction model training apparatus 10 for training and calculation.

In some embodiments, the storage 14 can comprise a semiconductor or solid-state memory, a magnetic tape, a removable computer diskette, a random-access memory (RAM), a read-only memory (ROM), a rigid magnetic disk, and/or an optical disk.

In some embodiments, each of the electrocardiograms corresponds to an earliest electrocardiogram segment of each of the original electrocardiograms, and each of the original electrocardiograms belongs to an atrial high rate episode state. In some embodiments, the original electrocardiograms are complete electrocardiograms recorded by a cardiac implantable electronic device (CIED) installed in the body of a patient during the patient has an atrial high rate episode symptom. In some embodiments, the original electrocardiograms comprise 2-lead electrocardiograms, namely, comprising the atrial lead and the ventricular lead.

Figure 3:
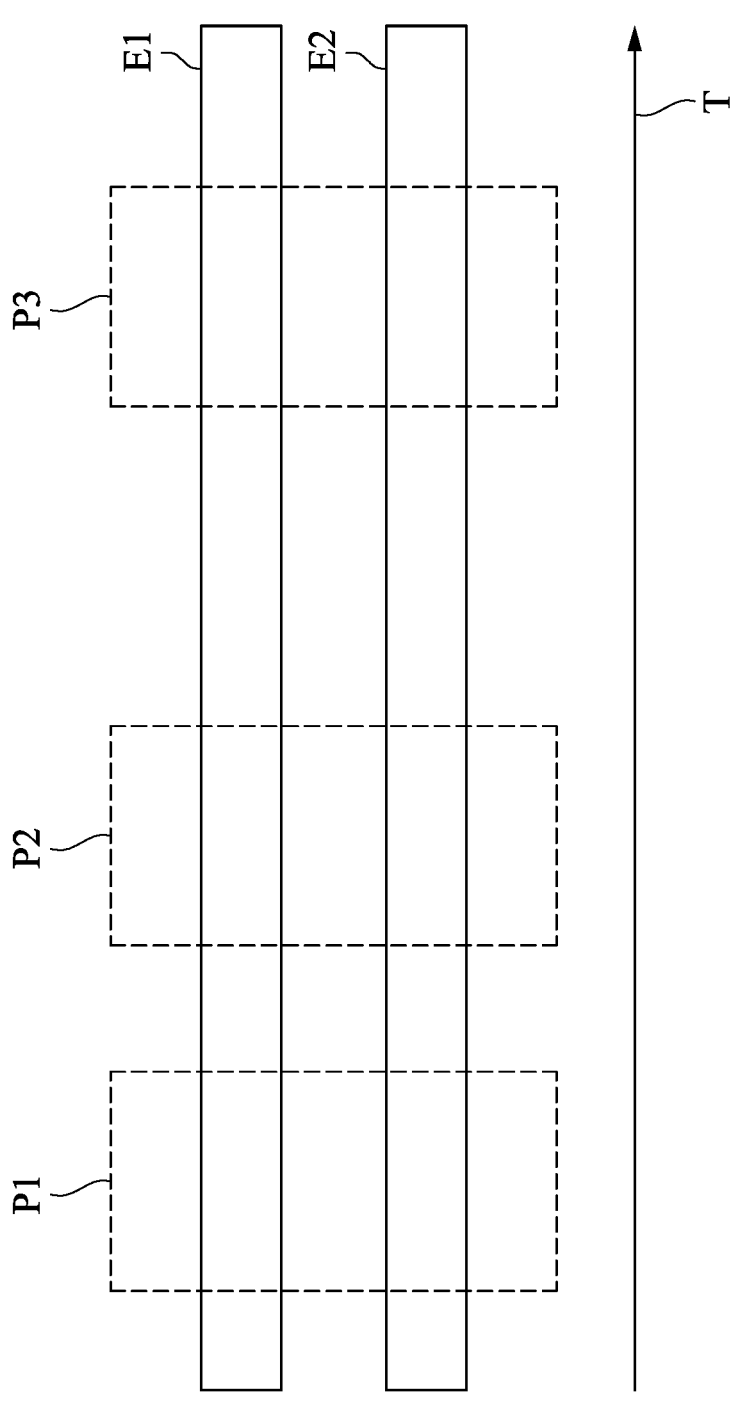
FIG. 3 is a schematic diagram illustrating selecting an electrocardiogram segment from original electrocardiograms according to some embodiments of the present disclosure.

In some embodiments, the cardiac implantable electronic device generates a plurality of electrocardiogram segments according to the duration of the atrial high rate episode symptom. Reference is made to FIG. 3. FIG. 3 is a schematic diagram illustrating selecting an electrocardiogram segment P1 from original electrocardiograms E1 and E2 according to some embodiments of the present disclosure. As shown in FIG. 3, the cardiac implantable electronic device measures heartbeats of the patient to generate the original electrocardiograms E1 corresponding to the atrial and the original electrocardiograms E2 corresponding to the ventricular, wherein the original electrocardiograms E1 and E2 correspond to the same time period T and record the complete process of beats generated by atrial and ventricular in the atrial high rate episode state respectively.

However, due to hardware constraints or other reason, the cardiac implantable electronic device only stores partial electrocardiogram segments P1, P2, and P3 of the original electrocardiograms E1 and E2, wherein each of the electrocardiogram segments P1, P2, and P3 comprises parts of electrocardiograms corresponding to the original electrocardiograms E1 and E2 in the same time period, and the electrocardiogram segment P1 is the earliest segment, the electrocardiogram segment P2 is the second segment, and the electrocardiogram segment P3 is the latest segment.

In an embodiment, the prediction model training apparatus 10 takes the electrocardiogram segment P1 as training data of the prediction model. Therefore, the prediction model can be configured to predict whether the atrial high rate episode state will last more than a time threshold according to the earliest electrocardiogram segment.

In some embodiments, if an atrial high rate episode state lasts less than 6 minutes, the cardiac implantable electronic device generates an electrocardiogram segment, and the electrocardiogram segment records partial electrocardiogram record during the atrial high rate episode state; if an atrial high rate episode state lasts 6 to 10 minutes, the cardiac implantable electronic device generates 2 electrocardiogram segments, and each of the electrocardiogram segments records partial electrocardiogram record during the atrial high rate episode state; and if an atrial high rate episode state lasts more than 10 minutes, the cardiac implantable electronic device generates 3 electrocardiogram segments, and each of the electrocardiogram segments records partial electrocardiogram record during the atrial high rate episode state. In the embodiment, the prediction model training apparatus 10 takes the earliest electrocardiogram segment of a single atrial high rate episode symptom as training electrocardiogram.

On the other hand, the episode data is configured to record related data of the atrial high rate episode symptom corresponding to the electrocardiogram. For example, the occurrence time and the episode duration of the atrial high rate episode symptom, wherein the episode duration is configured to determine whether the atrial high rate episode state corresponding to the electrocardiogram will last more than a preset time threshold (e.g., 6 minutes) and is taken as a label of the training data when the prediction model is trained. For example, if an episode duration exceeds the time threshold, the label of the corresponding electrocardiogram is labeled as positive (i.e., exceeded); otherwise, if an episode duration does not exceed the time threshold, the label of the corresponding electrocardiogram is labeled as negative (i.e., not exceeded).

In some embodiments, the episode data comprises a start recording time and an episode duration of the corresponding electrocardiogram in the atrial high rate episode state. For example, the electrocardiogram records the atrial high rate episode symptom from 29.0 seconds to 40.3 seconds, then the corresponding episode data comprises the start recording time as 29.0 seconds and the episode duration as 11.3 seconds.

The processor 12 is configured to train the prediction model according to the electrocardiogram, the episode data, and a patient data stored in the storage 14. In some embodiments, the processor 12 can comprise a central processing unit (CPU), a graphics processing unit (GPU), a multi-processor, a distributed processing system, an application specific integrated circuit (ASIC), and/or a suitable processing unit.

First, the processor 12 filters a plurality of valid electrocardiograms from a plurality of electrocardiograms according to an elimination rule.

In some embodiments, the elimination rule comprises eliminating at least one invalid electrocardiogram with heart rates adjusted by a pacemaker from the electrocardiograms. In other words, if there is a pacemaker installed in the body of the patient to adjust the heartbeats, the corresponding electrocardiogram will be classified as the invalid electrocardiogram and being eliminated, wherein whether the electrocardiogram is adjusted by a pacemaker can be labeled by the patient data or the episode data.

In some embodiments, the elimination rule comprises eliminating the at least one invalid electrocardiogram without an atrial tachycardia symptom or an atrial fibrillation symptom from the electrocardiograms. In other words, the processor 12 only preserves the electrocardiograms belonging to the atrial tachycardia symptom or the electrocardiograms belonging to the atrial fibrillation symptom as the electrocardiograms for training the prediction model.

In some embodiments, the elimination rule comprises eliminating the at least one invalid electrocardiogram corresponding to an episode duration lower than the time threshold and a total duration higher than a day threshold from the electrocardiograms. Specifically, there is a chance that a patient is in the atrial high rate episode state for most of the day, but one of the atrial high rate episodes is short. In the meantime, if the electrocardiogram (which is labeled as not exceeded the time threshold) corresponding to the atrial high rate episode is taken as a training data labeled as not exceeded, the prediction model may be misled. Thus, the processor 12 classifies the electrocardiograms with the summary of the episode duration of the electrocardiograms of the corresponding patient in one day (i.e., the total duration) higher than the day threshold (e.g., 1296 minutes) and the episode duration lower than the time threshold (e.g., 6 minutes) as the invalid electrocardiograms, and the processor 12 eliminates the invalid electrocardiograms.

According to the embodiment mentioned above, the processor 12 can eliminate the invalid electrocardiograms from the electrocardiograms and filter the valid electrocardiograms as the training data for training the prediction model.

Next, the processor 12 generates a plurality of training features corresponding to the valid electrocardiograms according to a training category set. The training category set can comprise one or more variation related to the electrocardiograms, the patients, and/or other factors, e.g., the medical histories of the patients, the waveform features of the electrocardiograms. In some embodiments, the training category set can be stored in the storage 14 or received from external device (e.g., a cloud database) by the prediction model training apparatus 10 for training and calculation.

Furthermore, the processor 12 transforms the corresponding data into training data (i.e., the training features) configured to train the prediction model according to the different variations in the training category set. For example, transforming the medical record data of the patients from string format into numbers, vectors, bits, and/or other formats of training data suitable for training the prediction model.

Finally, the processor 12 trains a prediction model according to the valid electrocardiograms, the training features, and a plurality of episode data corresponding to the valid electrocardiograms.

For example, the processor 12 takes the valid electrocardiograms, the training features, and the episode data as the training data to train the prediction model and generate prediction results. After that, the processor 12 adjusts the parameters of the prediction model according to the prediction results and the labels corresponding to the valid electrocardiograms. After repeat the operations mentioned above, the prediction model training apparatus 10 can obtain the prediction model with adjusted parameters, and the accuracy of the prediction model for predicting whether the atrial high rate episode state corresponding to the electrocardiogram will last more than the time threshold is higher after training.

In some embodiments, the prediction model can comprise a decision tree model, a support vector machine model, a logistic regression model, a Gaussian naive Bayes model, a k-nearest neighbors model, a random forest model, an eXtreme Gradient Boosting (XGBoost) model, an ensemble learning combining different algorithms, other machine learning models and/or combinations of models mentioned above.

In summary, according to the embodiments mentioned above, the prediction model training apparatus 10 can train the prediction model by using the electrocardiograms belonged to the atrial high rate episode state and the corresponding episode data. The prediction model is configured to predict whether an atrial high rate episode state will last more than a specific time period (i.e., the time threshold) according to the electrocardiogram belonging to the atrial high rate episode state.

In some embodiments, the training category set comprises at least one of a heart rate variability category, a medical record category, an amplitude category, a frequency spectrum category, or a combination thereof. With different combination of the training category set, the prediction model can introduce different factors and generate the prediction results.

The heart rate variability category can introduce features related to periods of the valid electrocardiograms as factors to train the prediction model, and the prediction model can generate prediction results according to the heart rate variability features of untested electrocardiograms; the medical record category can introduce the medical record of the patients corresponding to the valid electrocardiograms as factors to train the prediction model, and the prediction model can generate prediction results according to the medical record of the patients; the medical record category can introduce the medical record of the patients corresponding to the valid electrocardiograms as factors to train the prediction model, and the prediction model can generate prediction results according to the medical record of the patients; the amplitude category can introduce features related to amplitudes of the valid electrocardiograms as factors to train the prediction model, and the prediction model can generate prediction results according to the amplitude features of untested electrocardiograms; and the frequency spectrum category can introduce features related to frequencies of the valid electrocardiograms as factors to train the prediction model, and the prediction model can generate prediction results according to the frequency spectrum features of untested electrocardiograms.

In this embodiment, the prediction model training apparatus 10 can select different combinations of the categories in the training category set according to the data obtained and/or practical requirements to train the prediction model.

In some embodiments, if the training category set comprises the heart rate variability category, the operation of the processor 12 generating the training features corresponding to the valid electrocardiograms further comprises calculating a heart rate variability feature according to each of the valid electrocardiograms to generate a plurality of heart rate features corresponding to the valid electrocardiograms, wherein the training features comprise the heart rate features.

In some embodiments, the processor 12 calculates R-R intervals between the R waves and P-P intervals between the P waves of the valid electrocardiograms and calculates the average atrial rate (beat rate of the atrial per minute), the maximum atrial rate, the minimum atrial rate, the mean of the atrial rate, the standard deviation of atrial N-N intervals (SDNN), the root mean square of successive differences between normal atrial heartbeats (RMSSD), the standard deviation of successive P-P interval differences, and the statistic of atrial N-N intervals and takes at least one of the statistics mentioned above or a combination thereof, wherein the statistic of atrial N-N intervals can comprise the number of pairs of successive N-N intervals that differ by more than 50 ms (NN50) and the proportion of NN50 divided by total number of N-N intervals (pNN50).

On the other hand, the processor 12 also calculates the average ventricular rate (beat rate of the ventricular per minute), the maximum ventricular rate, the minimum ventricular rate, the mean of the ventricular rate, the standard deviation of ventricular N-N intervals (SDNN), the root mean square of successive differences between normal ventricular heartbeats (RMSSD), the standard deviation of successive R-R interval differences, and the statistic of ventricular N-N intervals and takes at least one of the statistics mentioned above or a combination thereof, wherein the statistic of ventricular N-N intervals can comprise the number of pairs of successive N-N intervals that differ by more than 50 ms (NN50) and the proportion of NN50 divided by total number of N-N intervals (pNN50).

In some embodiments, the processor 12 calculates the R-R intervals and the P-P intervals by using BioSPPy tool in Python according to the valid electrocardiograms and calculates the heart rate features according to the R-R intervals and the P-P intervals.

According to the embodiments mentioned above, the processor 12 can generate the heart rate features corresponding to the valid electrocardiograms. Since the training features comprise the heart rate features, the training features can introduce features related to periods of the valid electrocardiograms as factors to train the prediction model, and the prediction model can generate prediction results according to the heart rate variability features of untested electrocardiograms.

In some embodiments, the storage 14 is further configured to store the medical record data corresponding to the electrocardiograms. For example, the medical record data comprises gender, age, weight, height, body mass index (BMI), body surface area, creatinine (CREA), $CHA_2DS_2$-VASc score, whether the $CHA_2DS_2$-VASc score less than 2, myocardial infarction (MI) record, coronary artery disease (CAD) record, diabetes mellitus (DM) record, hypertension record, heart failure record, vascular disease record, atrial fibrillation record, and whether thyroid is abnormal corresponding to the patient. In some embodiments, the medical record data can be stored in the storage 14 or received from external device (e.g., a cloud database) by the prediction model training apparatus 10 for training and calculation.

Also, if the training category set comprises the medical record category, the processor 12 further generates a plurality of medical record features corresponding to the valid electrocardiograms according to the medical record data of each of the valid electrocardiograms, wherein the training features comprise the medical record features.

Specifically, the processor 12 can transform the medical record data corresponding to the valid electrocardiograms into training data (i.e., the medical record features) configured to train the prediction model, wherein the processor 12 can transform the medical record data into numbers, vectors, bits, and/or other formats of training data suitable for training the prediction model according to preset rule. For example, if the medical record data indicates the corresponding patient has medical history of diabetes, the medical record feature can be set as 1, otherwise, if the medical record data indicates the corresponding patient does not have medical history of diabetes, the medical record feature can be set as 0.

According to the embodiment mentioned above, the processor 12 can generate the medical record features corresponding to the valid electrocardiograms. Since the training features comprise the medical record features, the prediction model training apparatus 10 can introduce the medical record of the patients corresponding to the valid electrocardiograms as factors to train the prediction model, and the prediction model can generate prediction results according to the medical record of the patients.

In some embodiments, if the training category set comprises the amplitude category, the operation of the processor 12 generating the training features corresponding to the valid electrocardiograms further comprises calculating a amplitude feature according to each of the valid electrocardiograms to generate a plurality of amplitude features corresponding to the valid electrocardiograms, wherein the training features comprise the amplitude features.

For example, the processor 12 calculates the maximum value, minimum value, average value, and standard deviation of peak-to-peak amplitude of the atrial lead of electrocardiograms and the maximum voltage and minimum voltage of the atrial lead of electrocardiograms according to the atrial lead of the valid electrocardiograms; and the processor 12 calculates the maximum value, minimum value, average value, and standard deviation of peak-to-peak amplitude of the ventricular lead of electrocardiograms and the maximum voltage and minimum voltage of the ventricular lead of electrocardiograms according to the ventricular lead of the valid electrocardiograms.

According to the embodiment mentioned above, the processor 12 can generate the amplitude features corresponding to the valid electrocardiograms. Since the training features comprise the amplitude features, the training features can introduce features related to amplitude of the valid electrocardiograms as factors to train the prediction model, and the prediction model can generate prediction results according to the amplitude features of untested electrocardiograms.

In some embodiments, if the training category set comprises the frequency spectrum category, the operation of the processor 12 generating the training features corresponding to the valid electrocardiograms further comprises transforming the valid electrocardiograms into a plurality of energy values on a plurality of specific frequency bands. In some embodiments, the processor 12 can transform the atrial lead and the ventricular lead of the electrocardiograms (i.e., time domain distribution) into energy values on frequency domain by using fast Fourier transform (FFT), namely, the frequency spectrum distribution of the atrial lead and the ventricular lead of the electrocardiograms based on the frequency domain.

Next, the processor 12 calculates a frequency spectrum distribution of each of the valid electrocardiograms according to the energy values to obtain a plurality of frequency spectrum features corresponding to the valid electrocardiograms, wherein the training features comprise the frequency spectrum features.

As the embodiment mentioned above, in some embodiments, in the frequency spectrum distribution with data length N, only N/2 with the lower frequency can be utilized, and the others are noise data based on the characteristic of fast Fourier transform. Thus, the processor 12 takes the half frequency spectrum distribution with lower frequency as the frequency spectrum features. For example, the frequency spectrum distribution comprises frequency spectrum values corresponding to 0 Hz to 172 Hz, and only the frequency spectrum values corresponding to 0 Hz to 63 Hz are taken as the frequency spectrum features.

On the other hand, in some embodiments, a corresponding Nyquist frequency is calculated according to the sampling frequency (i.e., how many voltage values are measured in an electrocardiogram per second) of the atrial lead and the ventricular lead of the electrocardiograms, and only the frequency spectrum with frequency lower than the Nyquist frequency is taken. For example, if the sampling frequency of the electrocardiogram is 128 Hz, the corresponding Nyquist frequency is ½ of the sampling frequency, i.e. 64 Hz. Thus, the processor 12 takes the frequency spectrum values corresponding to frequency lower than 64 Hz as the frequency spectrum features, namely, the frequency spectrum values corresponding to 0 Hz to 63 Hz.

Also, in some embodiments, the prediction model training apparatus 10 can take the frequency spectrum of the whole or part of the frequency spectrum distribution as the frequency spectrum features based on test results (e.g., the precision of the models after training). For example, the processor 12 takes frequency spectrum values with the lowest frequency as the frequency spectrum features.

In some embodiments, the frequency spectrum features further comprises bispectrum features. Specifically, the processor 12 can further calculate the bispectrum features according to the frequency spectrum distribution of the atrial lead and the ventricular lead of the valid electrocardiograms.

For example, the processor 12 can calculate the normalized bispectral entropy, normalized bispectral squared entropy, sum of logarithmic amplitudes of the bispectrum, sum of logarithmic amplitudes of diagonal elements of the bispectrum, first-order spectral moment of the amplitudes of diagonal elements of the bispectrum, and second-order spectral moment of the amplitudes of diagonal elements of the bispectrum according to the frequency spectrum distribution of the atrial lead and the ventricular lead of the electrocardiograms, and the frequency spectrum features comprise at least one bispectrum feature selected from the group mentioned above or a combination thereof.

According to the embodiments mentioned above, the processor 12 can generate the frequency spectrum features corresponding to the valid electrocardiograms. Since the training features comprise the frequency spectrum features, the prediction model training apparatus 10 can introduce features related to frequency of the valid electrocardiograms as factors to train the prediction model, and the prediction model can generate prediction results according to the frequency spectrum features of untested electrocardiograms.

According to the embodiments mentioned above, the prediction model training apparatus 10 can filter suitable valid electrocardiograms and labels as training data from the electrocardiograms belonging to the atrial high rate episode state. Next, the prediction model training apparatus 10 selects one or more category form the training category set according to the considered variations and performs data extraction on the electrocardiograms according to the training category set to obtain the feature data. Finally, the prediction model training apparatus 10 trains the prediction model according to the valid electrocardiograms, the labels, and the feature data, wherein the prediction model is configured to generate a prediction result according to an electrocardiogram belonging to the atrial high rate episode state, and the prediction result is configured to predict whether the atrial high rate episode state corresponding to the electrocardiogram will last more than a time threshold. Therefore, the prediction model training apparatus 10 can predict whether the atrial high rate episode symptom will last more than a specific time and the risk of atrial fibrillation at the early stage of the symptom.

Reference is made to FIG. 2. FIG. 2 is a flow diagram illustrating a prediction model training method 20 according to some embodiments of the present disclosure. The prediction model training method 20 is adapted for use in a prediction model training apparatus, e.g., the prediction model training apparatus 10. The prediction model training apparatus comprises a processor and a storage, e.g., the processor 12 and the storage 14. The prediction model training method 20 is executed by the processor and comprising steps S22 to S26.

In the step S22, the processor filters a plurality of valid electrocardiograms from a plurality of electrocardiograms according to an elimination rule, wherein each of the electrocardiograms corresponds to an earliest electrocardiogram segment of each of a plurality of original electrocardiograms, and each of the original electrocardiograms belongs to an atrial high rate episode state. Next, in the step S24, the processor generates a plurality of training features corresponding to the valid electrocardiograms according to a training category set. Finally, in the step S26, the processor trains a prediction model according to the valid electrocardiograms, the training features, and a plurality of episode data corresponding to the valid electrocardiograms. Each of the episode data comprises an episode duration, the episode duration is configured to indicate a time period of the atrial high rate episode state; and the prediction model is configured to predict whether the atrial high rate episode state will last more than a time threshold according to an untested electrocardiogram in the atrial high rate episode state.

In some embodiments, the training category set comprises at least one of a heart rate variability category, a medical record category, an amplitude category, a frequency spectrum category, or a combination thereof.

In some embodiments, if the training category set comprises the heart rate variability category, the step of generating the training features corresponding to the valid electrocardiograms in the prediction model training method 20 further comprises calculating a heart rate variability feature according to each of the valid electrocardiograms to generate a plurality of heart rate features corresponding to the valid electrocardiograms, wherein the training features comprise the heart rate features.

In some embodiments, if the training category set comprises the medical record category, the step of generating the training features corresponding to the valid electrocardiograms in the prediction model training method 20 further comprises generating a plurality of medical record features corresponding to the valid electrocardiograms according to a medical record data of each of the valid electrocardiograms, wherein the training features comprise the medical record features.

In some embodiments, if the training category set comprises the amplitude category, the step of generating the training features corresponding to the valid electrocardiograms in the prediction model training method 20 further comprises calculating a amplitude feature according to each of the valid electrocardiograms to generate a plurality of amplitude features corresponding to the valid electrocardiograms, wherein the training features comprise the amplitude features.

In some embodiments, if the training category set comprises the frequency spectrum category, the step of generating the training features corresponding to the valid electrocardiograms in the prediction model training method 20 further comprises transforming the valid electrocardiograms into a plurality of energy values on a plurality of specific frequency bands; and calculating a frequency spectrum distribution of each of the valid electrocardiograms according to the energy values to obtain a plurality of frequency spectrum features corresponding to the valid electrocardiograms, wherein the training features comprise the frequency spectrum features.

In some embodiments, the step of filtering the valid electrocardiograms according to the elimination rule in the prediction model training method 20 further comprises eliminating at least one invalid electrocardiogram with heart rates adjusted by a pacemaker from the electrocardiograms; eliminating the at least one invalid electrocardiogram without an atrial tachycardia symptom or an atrial fibrillation symptom from the electrocardiograms; and eliminating the at least one invalid electrocardiogram corresponding to an episode duration lower than the time threshold and a total duration higher than a day threshold from the electrocardiograms.

In some embodiments, each of the heart rate features comprise at least one of an average atrial rate, a standard deviation of atrial N-N intervals, an average ventricular rate, a statistic of ventricular N-N intervals, or a combination thereof.

In some embodiments, each of the medical record data comprises at least one of a height, a weight, a body mass index, a creatinine value, a body surface area, an atrial fibrillation record, or a combination thereof.

In some embodiments, each of the amplitude features comprises maximum value and minimum value of peak-to-peak amplitude of the ventricular lead of each of the valid electrocardiograms.

In some embodiments, each of the frequency spectrum features corresponds to a plurality of lowest frequency spectrum values in the frequency spectrum distribution.

In addition to the above-mentioned steps, the prediction model training method 20 can also perform other operations and steps, have the same function, and achieve the same technical effect of the prediction model training apparatus 10. The person having ordinary skill in the art can directly understand how the prediction model training method 20 performs the operations and steps, has the same function and achieves the same technical effect based on the prediction model training apparatus 10 in the present disclosure, and the details will not be repeated.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A prediction model training method, being adapted for use in an electronic apparatus, wherein the prediction model training method comprises the following steps:

filtering a plurality of valid electrocardiograms from a plurality of electrocardiograms according to an elimination rule, wherein each of the electrocardiograms corresponds to an earliest electrocardiogram segment of each of a plurality of original electrocardiograms, and each of the original electrocardiograms belongs to an atrial high rate episode state;

generating a plurality of training features corresponding to the valid electrocardiograms according to a training category set, wherein the training category set comprises at least one of a heart rate variability category, a medical record category, an amplitude category, a frequency spectrum category, or a combination thereof; and training a prediction model according to the valid electrocardiograms, the training features, and a plurality of episode data corresponding to the valid electrocardiograms;

wherein each of the episode data comprises an episode duration, the episode duration is configured to indicate a time period of the atrial high rate episode state; and the prediction model is configured to predict whether the atrial high rate episode state will last more than a time threshold according to an untested electrocardiogram in the atrial high rate episode state;

wherein the step of filtering the plurality of valid electrocardiograms from the plurality of electrocardiograms according to the elimination rule further comprises:

eliminating at least one invalid electrocardiogram with heart rates adjusted by a pacemaker from the electrocardiograms;

eliminating the at least one invalid electrocardiogram without an atrial tachycardia symptom or an atrial fibrillation symptom from the electrocardiograms; and eliminating the at least one invalid electrocardiogram corresponding to an episode duration lower than the time threshold and a total duration higher than a day threshold from the electrocardiograms;

wherein if the training category set comprises the frequency spectrum category, the step of generating the plurality of training features corresponding to the valid electrocardiograms according to the training category set further comprises:

transforming the valid electrocardiograms into a plurality of energy values on a plurality of specific frequency bands; and calculating a frequency spectrum distribution of each of the valid electrocardiograms according to the energy values to obtain a plurality of frequency spectrum features corresponding to the valid electrocardiograms, wherein the training features comprise the frequency spectrum features.

2. The prediction model training method of claim 1, wherein if the training category set comprises the heart rate variability category, the step of generating the training features corresponding to the valid electrocardiograms further comprises:

calculating a heart rate variability feature according to each of the valid electrocardiograms to generate a plurality of heart rate features corresponding to the valid electrocardiograms, wherein the training features comprise the heart rate features.

3. The prediction model training method of claim 1, wherein if the training category set comprises the medical record category, the step of generating the training features corresponding to the valid electrocardiograms further comprises:

generating a plurality of medical record features corresponding to the valid electrocardiograms according to a medical record data of each of the valid electrocardiograms, wherein the training features comprise the medical record features.

4. The prediction model training method of claim 1, wherein if the training category set comprises the amplitude category, the step of generating the training features corresponding to the valid electrocardiograms further comprises:

calculating a amplitude feature according to each of the valid electrocardiograms to generate a plurality of amplitude features corresponding to the valid electrocardiograms, wherein the training features comprise the amplitude features.

5. The prediction model training method of claim 2, wherein each of the heart rate features comprise at least one of an average atrial rate, a standard deviation of atrial N-N intervals, an average ventricular rate, a statistic of ventricular N-N intervals, or a combination thereof.

6. The prediction model training method of claim 3, wherein each of the medical record data comprises at least one of a height, a weight, a body mass index, a creatinine value, a body surface area, an atrial fibrillation record, or a combination thereof.

7. The prediction model training method of claim 1, wherein each of the frequency spectrum features corresponds to a plurality of lowest frequency spectrum values in the frequency spectrum distribution.

8. A prediction model training apparatus, comprising:

a storage, configured to store a plurality of electrocardiograms and a plurality of episode data corresponding to the electrocardiograms, wherein each of the electrocardiograms belongs to an atrial high rate episode state, each of the episode data comprises an episode duration, and the episode duration is configured to indicate a time period of the atrial high rate episode state; and a processor, electrically connected to the storage, wherein the processor is configured to:

filtering a plurality of valid electrocardiograms from the electrocardiograms according to an elimination rule, wherein each of the electrocardiograms corresponds to an earliest electrocardiogram segment of each of a plurality of original electrocardiograms, and each of the original electrocardiograms belongs to the atrial high rate episode state;

generating a plurality of training features corresponding to the valid electrocardiograms according to a training category set, wherein the training category set comprises at least one of a heart rate variability category, a medical record category, an amplitude category, a frequency spectrum category, or a combination thereof; and training a prediction model according to the valid electrocardiograms, the training features, and the episode data corresponding to the valid electrocardiograms, wherein the prediction model is configured to predict whether the atrial high rate episode state will last more than a time threshold according to an untested electrocardiogram in the atrial high rate episode state;

wherein the operation of filtering the plurality of valid electrocardiograms from the electrocardiograms according to the elimination rule further comprises:

eliminating at least one invalid electrocardiogram with heart rates adjusted by a pacemaker from the electrocardiograms;

eliminating the at least one invalid electrocardiogram without an atrial tachycardia symptom or an atrial fibrillation symptom from the electrocardiograms; and eliminating the at least one invalid electrocardiogram corresponding to an episode duration lower than the time threshold and a total duration higher than a day threshold from the electrocardiograms;

wherein if the training category set comprises the frequency spectrum category, the operation of generating the plurality of training features corresponding to the valid electrocardiograms according to the training category set further comprises:

transforming the valid electrocardiograms into a plurality of energy values on a plurality of specific frequency bands; and calculating a frequency spectrum distribution of each of the valid electrocardiograms according to the energy values to obtain a plurality of frequency spectrum features corresponding to the valid electrocardiograms, wherein the training features comprise the frequency spectrum features.

9. The prediction model training apparatus of claim 8, wherein if the training category set comprises the heart rate variability category, the operation of generating the training features corresponding to the valid electrocardiograms further comprises:

calculating a heart rate variability feature according to each of the valid electrocardiograms to generate a plurality of heart rate features corresponding to the valid electrocardiograms, wherein the training features comprise the heart rate features.

10. The prediction model training apparatus of claim 8, wherein if the training category set comprises the medical record category, the operation of generating the training features corresponding to the valid electrocardiograms further comprises:

generating a plurality of medical record features corresponding to the valid electrocardiograms according to a medical record data of each of the valid electrocardiograms, wherein the training features comprise the medical record features.

11. The prediction model training apparatus of claim 8, wherein if the training category set comprises the amplitude category, the operation of generating the training features corresponding to the valid electrocardiograms further comprises:

calculating a amplitude feature according to each of the valid electrocardiograms to generate a plurality of amplitude features corresponding to the valid electrocardiograms, wherein the training features comprise the amplitude features.

12. The prediction model training apparatus of claim 9, wherein each of the heart rate features comprise at least one of an average atrial rate, a standard deviation of atrial N-N intervals, an average ventricular rate, a statistic of ventricular N-N intervals, or a combination thereof.

13. The prediction model training apparatus of claim 10, wherein each of the medical record data comprises at least one of a height, a weight, a body mass index, a creatinine value, a body surface area, and an atrial fibrillation record, or a combination thereof.

14. The prediction model training apparatus of claim 8, wherein each of the frequency spectrum features corresponds to a plurality of lowest frequency spectrum values in the frequency spectrum distribution.

* * * * *